(12) United States Patent
Yun et al.

(10) Patent No.: US 12,040,451 B2
(45) Date of Patent: Jul. 16, 2024

(54) STACK-TYPE ELECTRODE ASSEMBLY COMPRISING ELECTRODE WITH INSULATION LAYER AND LITHIUM SECONDARY BATTERY COMPRISING THE SAME

(71) Applicant: LG CHEM, LTD., Seoul (KR)

(72) Inventors: Hyunwoong Yun, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 464 days.

(21) Appl. No.: 16/964,518

(22) PCT Filed: Dec. 23, 2019

(86) PCT No.: PCT/KR2019/018311
§ 371 (c)(1),
(2) Date: Jul. 23, 2020

(87) PCT Pub. No.: WO2020/159083
PCT Pub. Date: Aug. 6, 2020

(65) Prior Publication Data
US 2021/0075064 A1 Mar. 11, 2021

(30) Foreign Application Priority Data

Feb. 1, 2019 (KR) .................. 10-2019-0014018
Dec. 20, 2019 (KR) .................. 10-2019-0172479

(51) Int. Cl.
*H01M 10/0585* (2010.01)
*H01M 4/62* (2006.01)
(Continued)

(52) U.S. Cl.
CPC ....... *H01M 10/0585* (2013.01); *H01M 4/622* (2013.01); *H01M 10/0525* (2013.01);
(Continued)

(58) Field of Classification Search
CPC .......... H01M 10/0585; H01M 50/531; H01M 50/409; H01M 4/622; H01M 10/0525;
(Continued)

(56) References Cited

U.S. PATENT DOCUMENTS 6,335,114 B1  1/2002 Ueshima et al.
9,698,399 B2  7/2017 Pan et al.
(Continued)

FOREIGN PATENT DOCUMENTS

CN  1393041 A   1/2003
CN  101447588   * 12/2010
(Continued)

OTHER PUBLICATIONS

Extended European Search Report issued by the European Patent Office dated Feb. 4, 2021 in a corresponding European Patent Application No. No. 19908076.3.
(Continued)

*Primary Examiner* — Matthew T Martin
*Assistant Examiner* — Taylor Harrison Krone
(74) *Attorney, Agent, or Firm* — Morgan, Lewis & Bockius LLP

(57) ABSTRACT

The present disclosure relates to an electrode assembly having a stack form of an electrode, a separator and a counter electrode, in which each of the electrode and the counter electrode includes a tab extending from a current collector; the electrode is larger than the counter electrode at four sides including a side from which the tap extends thereof, to have an exposed portion; and an insulation layer is formed on a tab portion of the electrode and on an edge portion of the electrode.

20 Claims, 2 Drawing Sheets

(51) Int. Cl.
  *H01M 10/0525* (2010.01)
  *H01M 50/491* (2021.01)
  *H01M 50/534* (2021.01)
  *H01M 50/536* (2021.01)

(52) U.S. Cl.
  CPC ....... *H01M 50/491* (2021.01); *H01M 50/534* (2021.01); *H01M 50/536* (2021.01)

(58) Field of Classification Search
  CPC . H01M 50/534; H01M 50/491; H01M 50/536
  See application file for complete search history.

(56) References Cited

U.S. PATENT DOCUMENTS

| | | | |
|---|---|---|---|
| 9,755,213 B2 | 9/2017 | Huh et al. | |
| 9,905,838 B2 | 2/2018 | Bando et al. | |
| 2002/0064710 A1 | 5/2002 | Kawakami et al. | |
| 2002/0182490 A1 | 12/2002 | Cho et al. | |
| 2006/0248710 A1 | 11/2006 | Fukumoto et al. | |
| 2009/0325057 A1 | 12/2009 | Kim et al. | |
| 2012/0052360 A1 | 3/2012 | Fujiwara et al. | |
| 2012/0301784 A1 | 11/2012 | Yano et al. | |
| 2013/0084479 A1 | 4/2013 | Nonaka et al. | |
| 2013/0288104 A1* | 10/2013 | Kang | H01M 10/0436 429/153 |
| 2014/0370358 A1* | 12/2014 | Hong | H01M 50/489 429/126 |
| 2015/0243964 A1 | 8/2015 | Yu et al. | |
| 2015/0364798 A1 | 12/2015 | Oshima et al. | |
| 2016/0315314 A1* | 10/2016 | Fanous | H01M 4/382 |
| 2016/0344006 A1* | 11/2016 | Ota | H01M 4/13 |
| 2017/0018756 A1 | 1/2017 | Kim et al. | |
| 2017/0250400 A1* | 8/2017 | Al | H01M 4/623 |
| 2018/0145376 A1 | 5/2018 | Jo et al. | |
| 2018/0166682 A1 | 6/2018 | Lee et al. | |
| 2018/0358649 A1* | 12/2018 | Inoue | H01M 10/0585 |
| 2019/0296306 A1* | 9/2019 | Sugizaki | H01M 50/46 |
| 2019/0393474 A1 | 12/2019 | Lee et al. | |
| 2020/0035973 A1 | 1/2020 | Mankyuu | |
| 2020/0119333 A1* | 4/2020 | Masuzawa | H01M 10/0525 |
| 2020/0168940 A1 | 5/2020 | Hong et al. | |
| 2020/0235369 A1* | 7/2020 | Jeong | H01M 10/0587 |
| 2020/0243919 A1* | 7/2020 | Yoon | H01M 50/46 |
| 2020/0403205 A1* | 12/2020 | Lee | H01M 50/443 |
| 2021/0057732 A1* | 2/2021 | Teranishi | H01M 4/622 |

FOREIGN PATENT DOCUMENTS

| | | | |
|---|---|---|---|
| CN | 102386437 A | 3/2012 | |
| CN | 104769754 A | 7/2015 | |
| CN | 108475827 A | 8/2018 | |
| EP | 3407417 A1 | 11/2018 | |
| EP | 3407417 A1 * | 11/2018 | ........ H01M 10/0436 |
| JP | H07-249403 A | 9/1995 | |
| JP | 2003-208891 A | 7/2003 | |
| JP | 4366783 B2 | 11/2009 | |
| JP | 2014-160635 A | 9/2014 | |
| JP | 2015-072758 A | 4/2015 | |
| JP | 2015-097159 A | 5/2015 | |
| JP | 2015-115321 A | 6/2015 | |
| JP | 5776446 B2 | 9/2015 | |
| JP | 2017-50102 A | 3/2017 | |
| JP | 6318882 B2 | 5/2018 | |
| JP | 10-2018-0064778 A | 6/2018 | |
| KR | 10-1998-0073911 A | 11/1998 | |
| KR | 10-0243830 B1 | 2/2000 | |
| KR | 10-2007-0108084 A | 11/2007 | |
| KR | 10-2008-0010166 A | 1/2008 | |
| KR | 10-2014-0055064 A | 5/2014 | |
| KR | 10-2015-0045786 A | 4/2015 | |
| KR | 10-2015-0046552 A | 4/2015 | |
| KR | 10-2015-0098445 A | 8/2015 | |
| KR | 10-1586530 B1 | 1/2016 | |
| KR | 10-2016-0014370 A | 2/2016 | |
| KR | 10-1603627 B1 | 3/2016 | |
| KR | 10-2016-0095354 A | 8/2016 | |
| KR | 10-2017-0064207 A | 6/2017 | |
| KR | 10-2017-0087606 A | 7/2017 | |
| KR | 10-1792572 B1 | 11/2017 | |
| KR | 10-2018-0032000 A | 3/2018 | |
| KR | 10-2018-0043183 A | 4/2018 | |
| KR | 10-2018-0058370 A | 6/2018 | |
| KR | 10-2018-0097085 A | 8/2018 | |
| WO | 2012/043812 A1 | 4/2012 | |
| WO | 2018/066184 A1 | 4/2018 | |
| WO | 2018/164076 A1 | 9/2018 | |

OTHER PUBLICATIONS

International Search Report and Written Opinion (NPL1) issued in corresponding International Patent Application No. PCT/KR2019/018311, dated Apr. 3, 2020.

International Search Report and Written Opinion (NPL2) issued in corresponding International Patent Application No. PCT/KR2020/001508, dated May 14, 2020.

Extended European Search Report issued by the European Patent Office dated May 3, 2021 in a corresponding European Patent Application No. 20749164.8.

Office action dated Jun. 22, 2023 issued in corresponding Chinese Patent Application No. 201980010130.4.

Office action dated Jul. 1, 2023 issued in corresponding Chinese Patent Application No. 202080001682.1.

Office Action dated Jun. 27, 2023 issued in related U.S. Appl. No. 16/978,133.

\* cited by examiner

[FIG. 1]
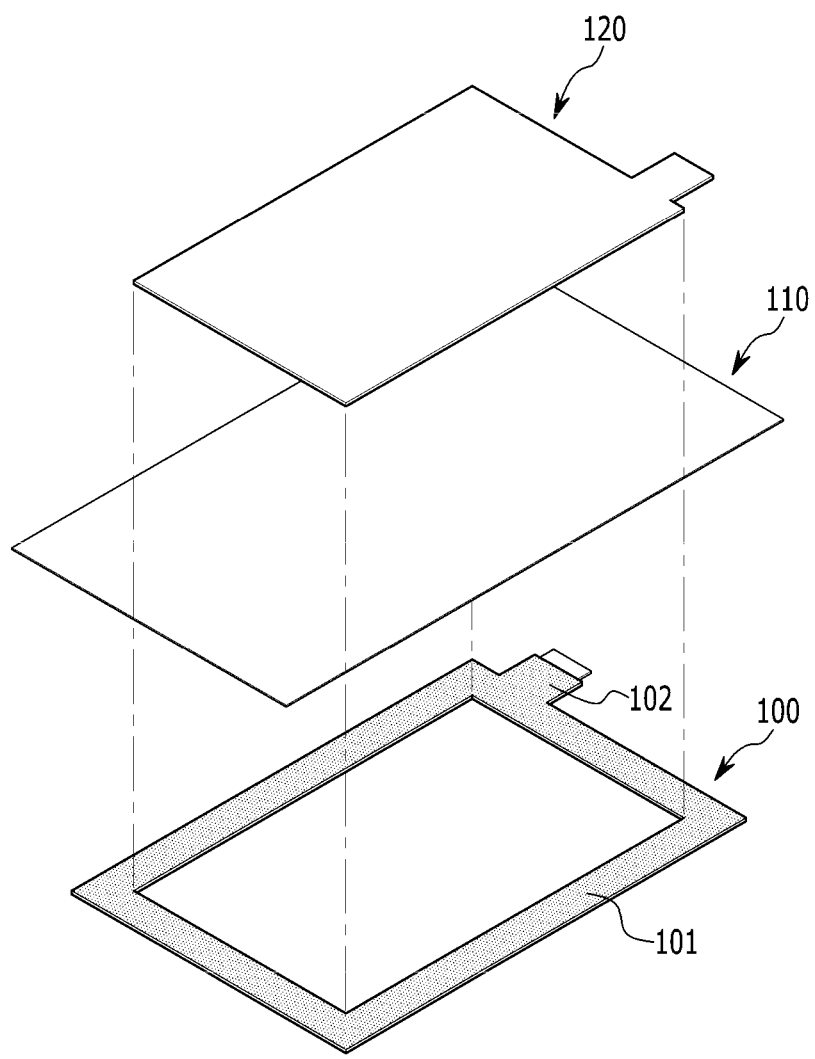

[FIG. 2]
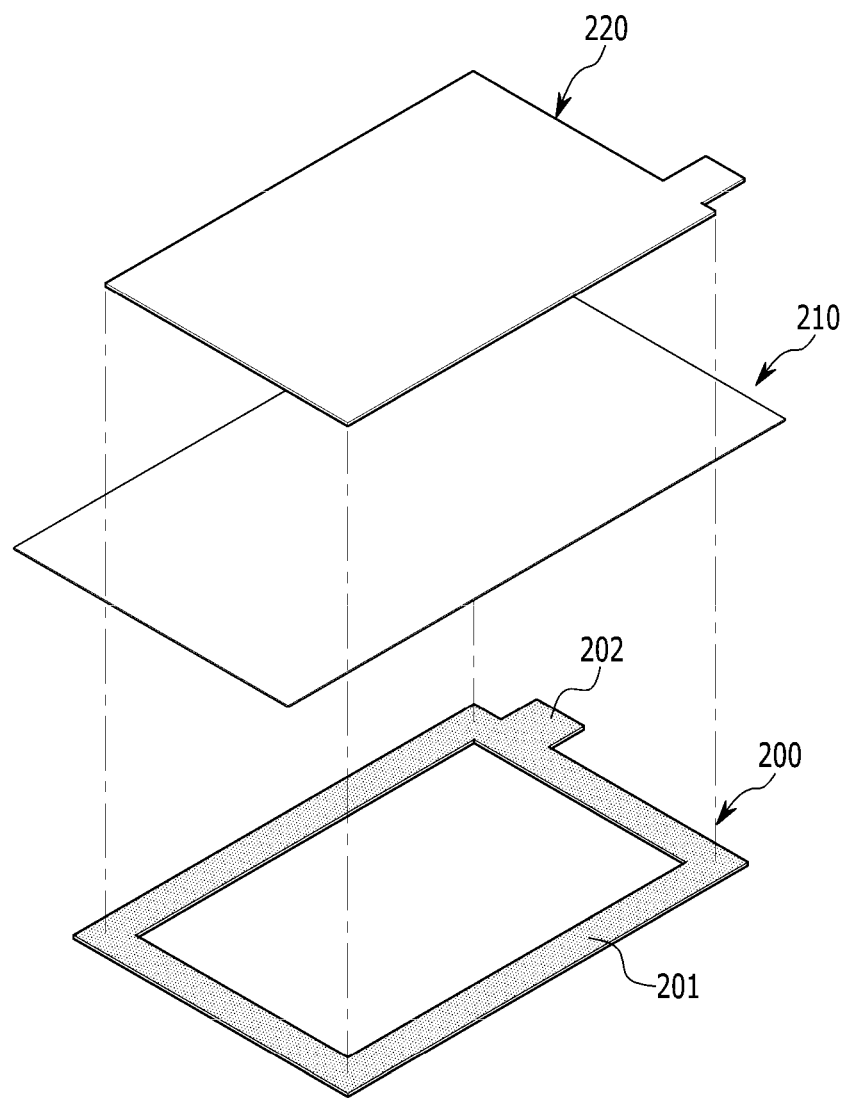

STACK-TYPE ELECTRODE ASSEMBLY COMPRISING ELECTRODE WITH INSULATION LAYER AND LITHIUM SECONDARY BATTERY COMPRISING THE SAME

TECHNICAL FIELD

Cross-Reference to Related Application

This application claims the benefits of Korean Patent Applications No. 10-2019-0014018 filed on Feb. 1, 2019 and No. 10-2019-0172479 filed on Dec. 20, 2019 with the Korean Intellectual Property Office, the disclosure of which is incorporated herein by reference in its entirety.

The present disclosure relates to a stack-type electrode assembly including an electrode with an insulation layer formed thereon, and a lithium secondary battery including the same.

BACKGROUND OF ART

With a rapid increase in the use of fossil fuels, there is a growing demand for using alternative energy or clean energy. As a part of this trend, most active research efforts have been concentrated on power generation and storage fields which use electrochemistry.

Now, a typical example of electrochemical elements using such electrochemical energy includes a secondary battery, and its use has been gradually expanding in a wide range of fields.

Recently, with much progress in and growing demand for the technological development of portable devices such as portable computers, portable telephones, cameras, and the like, there has been also a rapidly growing demand for secondary batteries as an energy source. Out of such secondary batteries, many studies have been conducted on lithium secondary batteries that are environmentally friendly and exhibit high charge and discharge characteristics as well as long life characteristics. Also, such lithium secondary batteries have been commercialized and widely used.

An electrode assembly built in a battery case is a power generation element capable of charging and discharging having a stacking structure of a positive electrode, a separator and a negative electrode. The electrode assembly is classified into: a jelly-roll type in which a separator is interposed between long sheet-type positive and negative electrodes with an active material applied thereon, all of which are then wounded together; a stack type in which a plurality of positive and negative electrodes having a predetermined size are sequentially stacked with a separator interposed therebetween; a combination thereof, i.e., a stack/folding type in which a bi-cell or a full-cell including a positive electrode, a negative electrode and a separator is wound into a long sheet-type separation film; and a lamination/stack type in which the bi-cell or the full-cell is sequentially laminated and stacked.

Meanwhile, a lithium secondary battery generally has a structure in which a non-aqueous electrolytic solution is impregnated into an electrode assembly including a positive electrode, a negative electrode and a porous separator. In general, the positive electrode is manufactured by coating a positive electrode mixture including a positive electrode active material onto an aluminum foil, and the negative electrode is manufactured by coating a negative electrode mixture including a negative electrode active material onto a copper foil.

In general, the positive electrode active material is a lithium transition metal oxide, and the negative electrode active material is a carbon-based material. Recently, however, a lithium metal battery, which uses lithium metal itself as the negative electrode active material, has been commercialized. Furthermore, there have been actively ongoing studies on a lithium-free battery which uses a current collector only as the negative electrode upon manufacturing and subsequently receives lithium from the positive electrode by means of discharging to use lithium metal as the negative electrode active material.

Meanwhile, such lithium secondary battery has a risk of causing a short circuit due to a contact between the positive electrode and the negative electrode when being exposed to high temperatures. Also, if a large amount of electric current flows within a short period of time due to overcharge, external short, local crush, etc., there is a risk of ignition/explosion as the battery is heated by means of an exothermic reaction.

In particular, in case of the lithium metal battery which uses lithium metal as the negative electrode active material, a dendrite grows as charge and discharge is repeated. As a certain level of degeneration progresses, the dendrite falls off, then flows with an electrolytic solution, and then flows out of a poorly bonded portion of the separator. After that, such fallen dendrite comes into contact with the positive electrode to cause a short circuit. Thus, there is a problem of losing an electrochemical performance.

To address such phenomenon, an insulation tape has been attached onto an electrode tab to prevent the short circuit with the counter electrode. However, such phenomenon does not occur to the tab portion only, and thus the use of such insulation tape is not still enough to meet the demand for securing the safety of batteries.

Accordingly, there is still a high demand for a structure capable of efficiently securing the safety of batteries by solving the problems above.

DETAILED DESCRIPTION OF THE INVENTION

Technical Problem

Accordingly, the present disclosure has been made in an effort to solve the aforesaid problems of the prior art as well as the technical objects that have been requested from the past.

Specifically, an object of the present disclosure is to provide an electrode assembly having a structure capable of preventing a short circuit with a counter electrode caused by an edge of an electrode and/or a tab of the electrode in a stack-type electrode assembly including the electrode and the counter electrode, which have mutually different sizes, and a lithium secondary battery including the same.

Another object of the present disclosure is to provide an electrode assembly capable of securing a capacity of the battery by appropriately selecting a composition of an insulation layer, while preventing the short circuit as above at the same time, and a lithium secondary battery including the same.

Further, another object of the present disclosure is to provide an electrode assembly which has a structure capable of efficiently preventing a short circuit of the electrode caused by a dendrite phenomenon of lithium metal in a lithium metal battery or a lithium-free battery, and a lithium secondary battery including the same.

Technical Solution

Accordingly, the present disclosure provides: an electrode assembly having a stack form of an electrode, a separator and a counter electrode;
   wherein each of the electrode and the counter electrode includes a tab extending from a current collector;
   the electrode is larger than the counter electrode at four sides including a side from which the tap extends thereof, to have an exposed portion; and
   an insulation layer is formed on a tab portion of the electrode and on an edge portion of the electrode.

Here, the insulation layer formed on the tab portion of the electrode means the entire tab or a part of the tab.

Meanwhile, the edge portion means an exposed portion of the electrode not facing the counter electrode, or a portion including the exposed portion of the electrode not facing the counter electrode and a part of the portion of the electrode facing the counter electrode.

Here, the part of the portion of the electrode facing the counter electrode also means a pre-determined portion adjacent to the exposed portion not facing the counter electrode, and includes a part of the portion overlapping with an edge of the counter electrode.

At this time, the part of the portion facing the counter electrode may be 1 to 10% of an entire area of the counter electrode.

In a process, it is difficult to manufacture such part of the overlapping portion to be less than 1% beyond the range above, unless there will be no part of the overlapping portion at all. It is not preferable to manufacture the part of the overlapping portion to be more than 10% because of high costs of materials.

To describe the form above, FIGS. 1 and 2 show the exploded perspective views of an electrode (101 or 201), a separator (110 or 210) and a counter electrode (120 or 220), which are the components of the electrode assembly according to the present invention.

Referring to FIG. 1, the insulation layer formed on the electrode of FIG. 1 is formed on a part of the tab and an edge portion of an exposed portion not facing the counter electrode.

Specifically, the insulation layer (shaded) is formed on a tab portion 102 and an edge portion 101 of an electrode 100. Here, the tab portion 102 is a part of the tab, and the edge portion 101 is so configured that the four apexes of a counter electrode 120 match the four inner apexes of the insulation layer (shaded) formed in the edge portion 101 of the electrode, and thus the edge portion 101 is an exposed portion not facing the counter electrode 120.

Referring to FIG. 2, an insulation layer formed on the electrode of FIG. 2 is formed on an entire tab, an exposed portion not facing the counter electrode, and a portion including a part of the portion of the electrode facing the counter electrode.

Specifically, an electrode 200 is so configured that an insulation layer (shaded) is formed on a tab portion 202 and an edge portion 201, too. However, when comparing with FIG. 1, the tab portion 202 is the entire tab, and the edge portion 201 is so configured that the four inner apexes of the insulation layer (shaded) formed on the tab portion 201 are located inside the four apexes of the counter electrode 220, thereby including an edge portion not facing the counter electrode 220 and a part of the portion facing the counter electrode 220 adjacent thereto.

In other words, if a positive electrode and a negative electrode have mutually different sizes when manufacturing a lithium secondary battery, one electrode has a portion not facing the other electrode, and thus a strength of lamination in the portion not facing the other electrode becomes weaker. Also, when a dendrite of lithium metal grows, the dendrite flows out of the portion with the weak strength of the lamination and comes into contact with a counter electrode current collector, and thus a short circuit is likely to occur.

Thus, the inventors of the present application have made every effort on in-depth research and have found that protrusion of dendrites may be suppressed to achieve a better safety, if there is an increase in the strength of lamination with a separator by forming an insulation layer not only on a tab but also on an edge portion of an electrode which is larger than a counter electrode.

Further, in the case of forming the insulation layer on the tab portion and the edge portion of the electrode larger than the counter electrode, and even in the case of forming the insulation layer only on the edge portion thereof to protect the portion above, such cases may secure a similar level of safety to that of the case of forming the insulation layer on the electrode as a whole, and also may be more excellent in terms of cost than the case of forming the insulation layer as a whole.

Meanwhile, to achieve such effect, the insulation layer may be formed in a direction of facing the counter electrode, and thus may be formed on the portion in one side or both sides.

However, if the insulation layer is formed on both sides, the tab portion means a part of the tab.

The insulation layer may be an insulation film, an organic layer consisting of a binder polymer, or an organic-inorganic mixed layer comprising inorganic particles and a binder polymer.

If the insulation layer is an insulation film, the insulation film may be a thermoplastic polymer film. If the insulation film is the thermoplastic polymer film, the thermoplastic polymer thereof may be selected from the group consisting of polyimide (PI), polyolefine such as polyethylene (PE) and polypropylene (PP); polyethylene terephthalate (PET); and polybutylene terephthalate (PBT), particularly polyethylene terephthalate, but not limited thereto.

Further, if the insulation layer is an organic layer consisting of a binder polymer or an organic-inorganic mixed layer including inorganic particles and a binder polymer, the insulation layer may not take on a film form, and may take on a form manufactured in such a way that a binder polymer composition or an organic-inorganic mixed composition for forming the insulation layer is applied onto a portion to be applied and then dried.

Here, the binder polymer of the organic layer or the organic-inorganic mixed layer is not limited, unless the binder polymer causes a side reaction with an electrolytic solution. In particular, however, the binder polymer used may be the one of which a glass transition temperature (Tg) is as low as possible, preferably in a range of −200 to 200° C. That's because such binder polymer may improve mechanical properties of a final insulation layer.

Further, the binder polymer does not need to have an ion conduction capacity, but it is more preferable to use the polymer having the ion conduction capacity. If the insulation layer covers a part of the electrode, the lithium ions of an active material may be moved even in such covered portion, which is preferable in terms of capacity.

Thus, it is preferable that the binder polymer has a high dielectric constant. Indeed, a degree of dissociation of salt in an electrolytic solution depends on the dielectric constant of an electrolytic solvent. As the dielectric constant of the polymer increases, the degree of dissociation of salt in the electrolyte may be improved. The dielectric constant of the polymer used may be 1 or more, particularly in a range of 1.0 to 100 (measurement frequency=1 kHz), and preferably 10 or more.

In addition to the functions described above, the binder polymer may have a feature of being gelled to show a high degree of swelling with an electrolytic solution, when being impregnated into the liquid electrolytic solution. Indeed, if the binder polymer is a polymer having an excellent degree of swelling with an electrolytic solution, the electrolytic solution injected after assembling of a battery permeates the polymer, and the polymer retaining the absorbed electrolytic solution comes to have an ion conduction capacity for the electrolyte. Thus, if possible, a solubility index of the polymer is preferably in a range of 15 to 45 MPa$^{1/2}$, more preferably in a range of 15 to 25 MPa$^{1/2}$ and 30 to 45 MPa$^{1/2}$. If the solubility index is less than 15 MPa$^{1/2}$ and more than 45 MPa$^{1/2}$, it becomes difficult to have swelling with the liquid electrolytic solution for a conventional battery.

Examples of such binder polymer include polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, celluloseacetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, a mixture thereof, or the like, but are not limited thereto. Any materials may be used alone or in combination, as long as they include the characteristics described above.

Meanwhile, if the insulation layer is an organic-inorganic mixed layer, an inorganic particle, i.e., another component which forms the organic-inorganic mixed layer makes it possible to form an empty space between inorganic particles, and plays a role to form a fine porosity and also serves as a spacer capable of maintaining a physical form. Further, the inorganic particle has a feature of not having a physical property changed even at a high temperature of 200° C., and thus the organic-inorganic mixed layer formed comes to have an excellent thermal resistance.

The inorganic particle is not particularly limited, as long as it is electrochemically stable. In other words, the inorganic particle which may be used in the present disclosure is not particularly limited, unless it causes an oxidation and/or reduction reaction in a working voltage range of a battery to be applied (e.g., 0-5V based on Li/Li+). In particular, in case of using an inorganic particle having an ion transfer capacity, an ionic conductance in electrochemical elements may be increased to improve a performance, and thus the one having a high ion conductance is preferable. Further, if the inorganic particle has a high density, it is difficult to disperse such particles during coating and there is a problem of increasing a weight when manufacturing a battery. Thus, the one having a small density is preferable, if possible. In addition, an inorganic material having a high dielectric constant contributes to an increase in a degree of dissociation of electrolytic salt in liquid electrolyte, e.g., lithium salt to improve an ion conductance of the electrolytic solution.

For the reasons described above, it is preferable that the inorganic particle is a high dielectric inorganic particle, of which dielectric constant is 1 or more, 5 or more, preferably 10 or more; an inorganic particle having piezoelectricity; an inorganic particle having a lithium ion transfer capacity; or a mixture thereof.

The inorganic particle having piezoelectricity means a material which is a non-conductor at atmospheric pressure, but which has an electrified property due to a change in an internal structure when a certain pressure is applied. Such inorganic particle exhibits a high dielectric characteristic, in which a dielectric constant is 100 or more. If such inorganic particle is elongated or compressed upon the application of a certain pressure, electric charges are generated to respectively charge one side positively and the other side negatively. Thus, such particle is a material which has a function of causing a potential difference between both sides.

If the inorganic particle having the characteristics as above is used as a component of the insulation layer, this particle may not only prevent both electrodes from coming into direct contact by external shock or dendritic growth, but also generate a potential difference within the particle by external shock due to piezoelectricity of the inorganic particle. Thus, an electron transfer between both electrodes, i.e., a flow of minute electric currents is made to accomplish a gradual decrease in a battery voltage, thereby improving safety.

Examples of the inorganic particle having piezoelectricity include $BaTiO_3$, $Pb(Zr,Ti)O_3$ (PZT), $Pb_{1-x}La_xZr_{1-y}Ti_yO_3$ (PLZT), $PB(Mg_3Nb_{2/3}O_3—PbTiO_3(PMN-PT)$ hafnia ($HfO_2$), a mixture thereof or the like, but are not limited thereto.

The inorganic particle having the lithium ion transfer capacity refers to an inorganic particle which has a function of containing a lithium element, but not storing lithium to move a lithium ion. The inorganic particle having the lithium ion transfer capacity may transfer and move a lithium ion due to a kind of defects present inside a structure of particle. Thus, such particle may prevent a decrease in lithium mobility caused by coating of the insulation layer, thereby preventing a decrease in a battery capacity.

Examples of the inorganic particle having the lithium ion transfer capacity include: $(LiAlTiP)_xO_y$-based glass ($0<x<4$, $0<y<13$) such as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $14Li_2O-9Al_2O_3-38TiO_2-39P_2O_5$, etc.; lithium germanium thiophosphate ($Li_xGe_yP_zS_w$, $0<x<4$, $0<y<1$, $0<z<1$, $0<w<5$) such as lithium lanthanum titanate ($Li_xLa_yTiO_3$, $0<x<2$, $0<y<3$), $Li_{3.25}Ge_{0.25}P_{0.75}S_4$, etc.; lithium nitride ($Li_xN_y$, $0<x<4$, $0<y<2$) such as $Li_3N$, etc.; $SiS_2$-based glass ($Li_xSi_yS_z$, $0<x<3$, $0<y<2$, $0<z<4$) such as $Li_3PO_4—Li_2S—SiS_2$, etc.; $P_2S_5$-based glass ($Li_xP_yS_z$, $0<x<3$, $0<y<3$, $0<z<7$) such as $LiI—Li_2S—P_2S_5$, etc.; a mixture thereof; or the like, but are not limited thereto.

Further, examples of the inorganic particle having a dielectric constant of 5 or more include $SrTiO_3$, $SnO_2$, $CeO_2$, MgO, NiO, CaO, ZnO, $ZrO_2$, $Y_2O_3$, $Al_2O_3$, $TiO_2$, SiC, a mixture thereof or the like, but are not limited thereto. In case of using the above-described high dielectric inorganic particle, the inorganic particle having piezoelectricity and the inorganic particle having the lithium ion transfer capacity together, a synergy effect thereof may be doubled.

A size of the inorganic particle is not limited, but it is preferable that the size thereof is in a range of 0.001 to 10 μm, if possible, in order to form an insulation layer with an even thickness and form an appropriate porosity between the inorganic particles. If such size is less than 0.001 μm, dispersibility is deteriorated and thus it becomes difficult to control a property of the organic-inorganic mixed layer. If such size is more than 10 μm, a thickness is increased to degrade the mechanical property and also the insulation layer does not fulfill a role thereof due to an excessively large pore size, but increases a chance of causing an internal short circuit while charging and discharging a battery.

A content of the inorganic particle is not particularly limited, but it is preferable that such content is in a range of 1 to 99 wt %, more preferably in a range of 10 to 95% per 100 wt % of a mixture of inorganic particle and binder polymer. If the content thereof is less than 1 wt %, the content of polymer becomes excessively large to decrease a pore size and a porosity due to a decrease in empty space formed between inorganic particles, and thus mobility of lithium ion may be deteriorated. In contrast, if the content thereof is more than 99 wt %, the content of polymer becomes excessively small to deteriorate a mechanical property of the final insulation layer due to a weakened adhesive strength between inorganic materials.

As such, the organic-inorganic mixed layer including the binder polymer and the inorganic particles has an even pore structure formed by an interstitial volume between inorganic particles. Through such pore, a lithium ion is smoothly moved and a large amount of electrolytic solution is filled to show a high rate of impregnation, thereby preventing a decrease in a battery performance caused by a formation of the insulation layer.

At that time, the pore size and the porosity may be controlled together by adjusting the size and content of the inorganic particle.

Further, the organic-inorganic mixed layer including the inorganic particles and the binder polymer does not have a thermal contraction at high temperatures due to thermal resistance of the inorganic particles. Thus, the insulation layer is maintained even under stress conditions caused by internal or external factors such as high temperatures, external shocks, etc., thereby being effective in preventing a short circuit.

A thickness of such insulation layer formed may be, for example, 0.1 to 100 μm, particularly 10 μm or more, 20 μm or more, or 30 μm or more, and may be 90 μm or less, 80 μm or less, or 70 μm or less.

If a thickness of the insulation layer is too low beyond the range above, an effect of preventing a short circuit may not be achieved. If the thickness thereof is too high, it is not preferable in that an overall volume of the electrode becomes large and the mobility of lithium ions is deteriorated.

Meanwhile, the tab extending from the current collector may be combined to the current collector by welding and may be punched in a form extending from the current collector upon punching of the electrode.

In a specific example, the electrode may be a negative electrode and the counter electrode may be a positive electrode. Alternatively, the electrode may be a positive electrode and the counter electrode may be a negative electrode.

However, when manufacturing a lithium secondary battery, the negative electrode receives lithium from the positive electrode. At that time, if the negative electrode fails to receive all the lithium coming from the positive electrode, a lithium dendrite grows on a surface of the negative electrode to deteriorate the safety of the battery. Thus, it is preferable to manufacture the negative electrode to be larger than the positive electrode. Thus, particularly, the electrode according to the present disclosure may be the negative electrode and the counter electrode may be the positive electrode.

In general, the positive electrode is so configured that an active material layer including a positive electrode active material, a binder, a conductive material, etc., is formed on a positive electrode current collector.

The positive electrode current collector is generally manufactured to have a thickness of 3-500 μm, which is not particularly limited, as long as such current collector has a high conductivity while not causing a chemical change to the battery. For example, such current collector used may be one selected from stainless steel, aluminum, nickel, titanium, and aluminum or stainless steel surface-treated with carbon, nickel, titanium or silver, particularly aluminum. The current collector may increase an adhesive strength of the positive electrode active material in such a way that a minute unevenness is formed on a surface thereof, and may have various forms such as film, sheet, foil, net, porous body, foam body, non-woven fabric body, etc.

The positive electrode active material may include, for example, a layered compound or a compound substituted with one or more transition metals such as lithium nickel oxide ($LiNiO_2$), etc.; a lithium manganese oxide such as the chemical formula of $Li_{1+x}Mn_{2-x}O_4$ (wherein, x is 0-0.33), $LiMnO_3$, $LiMn_2O_3$, $LiMnO_2$, etc.; a lithium-copper oxide ($Li_2CuO_2$); a vanadium oxide such as $LiV_3O_8$, $LiV_3O_4$, $V_2O_5$, $Cu_2V_2O_7$, etc.; a Ni-site type lithium nickel oxide represented by the chemical formula of $LiNi_{1-x}M_xO_2$ (wherein, M=Co, Mn, Al, Cu, Fe, Mg, B or Ga and x=0.01-0.3); a lithium manganese composite oxide represented by the chemical formula of $LiMn_{2-x}M_xO_2$ (wherein, M=Co, Ni, Fe, Cr, Zn or Ta and x=0.01-0.1) or $Li_2Mn_3MO_8$ (wherein, M=Fe, Co, Ni, Cu or Zn); $LiMn_2O_4$ in which a part of Li of the chemical formula is substituted with an alkaline earth metal ion; a disulfide compound; $Fe_2(MoO_4)_3$, but not limited thereto.

The conductive material is conventionally added in an amount of 0.1 to 30 wt % based on a total weight of the mixture containing a positive electrode active material. Such conductive material is not particularly limited, as long as it has conductivity while not causing a chemical change to the battery, in which the followings may be used: for example, graphite such as natural graphite, artificial graphite or the like; carbon black such as carbon black, acetylene black, ketjen black, channel black, furnace black, lamp black, thermal black, etc.; conductive fiber such as carbon fabric, metal fabric or the like; metal powder such as fluorocarbon, aluminum, nickel powder, etc.; conductive whiskey such as zinc oxide, potassium titanate, etc.; conductive metal oxide such as titanium oxide, etc.; polyphenylene derivatives, etc.

The binder is a component which assists in binding of an active material, a conductive material and the like as well as binding of a current collector, and is conventionally added in an amount of 0.1 to 30 wt % based on a total weight of the mixture containing a positive electrode active material. Examples of such binder include polyvinylidene fluoride, polyvinylidene fluoride-hexafluoropropylene, polyvinyl alcohol, carboxymethyl cellulose (CMC), starch, hydroxypropyl cellulose, regenerated cellulose, polyvinyl pyrrolidone, tetrafluoroethylene, polytetrafluoroethylene, polyethylene, polypropylene, ethylene-propylene-diene terpolymer (EPDM), sulfonated EPDM, styrene-butadiene rubber, fluoro rubber, various copolymers, etc.

In general, the negative electrode is so configured that an active material layer including a negative electrode active material, a binder, a conductive material, etc., is formed on a negative electrode current collector.

In general, the negative electrode current collector is made to have a thickness of 3 to 500 μm. Such negative electrode current collector is not particularly limited, as long as it has conductivity while not causing a chemical change to the battery. For example, such current collector used may be copper, stainless steel, aluminum, nickel, titan, baked carbon, copper or stainless steel surface-treated with carbon, nickel, titan, silver, etc., aluminum-cadmium alloy, etc. Further, like the positive electrode current collector above, the negative electrode current collector may increase a binding force of the negative electrode active material in such a way that a minute unevenness is formed on a surface thereof, and may be used in various forms such as film, sheet, foil, net, porous body, foam body, non-woven fabric body, etc.

As the negative electrode active material, the followings may be used: for example, carbon such as hard-graphitized carbon, graphite-based carbon, etc.; a metal composite oxide such as $Li_xFe_2O_3(0≥x≥1)$, $Li_xWO_2(0≥x≥1)$, $Sn_xMe_{1-x}Me'_yO_z$ (Me: Mn, Fe, Pb, Ge; Me': Al, B, P, Si, Group 1, 2 and 3 elements in the periodic table, halogen; $0<x≥1$; $1≥x≥3$, $1≥z≥8$), etc.; lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ and the like; a conductive polymer such as polyacetylene, etc.; a Li—Co—Ni-based material, etc.

Further, the negative electrode may be formed only with lithium metal without the current collector. At that time, the lithium metal performs the roles of the current collector and the active material at the same time.

As such, a lithium secondary battery including the negative electrode formed with lithium metal, or the negative electrode including lithium metal as an active material in the current collector is called a lithium metal battery.

Alternatively, the negative electrode may be formed with the current collector only as described above.

Such negative electrode receives lithium from the positive electrode caused by discharging of the lithium secondary battery and forms lithium metal on the current collector. As such, the lithium secondary battery including the negative electrode formed only with the current collector is called a lithium-free battery.

Meanwhile, as a separator interposed between the positive electrode and the negative electrode, an insulating thin film having a high ion permeability and a mechanical strength is used. A pore diameter of the separator is generally 0.01 to 10 µm, and a thickness thereof is generally 5 to 300 µm. As the separator, the followings may be used: for example, an olefin-based polymer such as chemical resistant and hydrophobic polypropylene, etc.; a sheet or non-woven fabric made of glass fiber, polyethylene or the like; etc. If a solid electrolyte such as a polymer is used as an electrolyte, the solid electrolyte may serve as the separator, too.

Further, the separator may be a SRS (Safety Reinforced Separator) separator. The SRS separator has a structure in which the organic/inorganic composite porous coating layer is coated on a substrate of the polyolefin-based separator.

Inorganic particles and a binder polymer which form the organic/inorganic composite porous coating layer of the SRS separator are similar to the one described above, and the content disclosed in the present applicant's application no. 10-2009-0018123 is hereby incorporated by reference.

The present disclosure also provides a lithium secondary battery including the electrode assembly and an electrolyte.

As the electrolyte, a non-aqueous electrolytic solution containing lithium salt is generally used, and this non-aqueous electrolytic solution includes a non-aqueous electrolytic solution and a lithium salt. As the non-aqueous electrolytic solution, the followings may be used: a non-aqueous organic solvent, an organic solid electrolyte, an inorganic solid electrolyte, etc., but not limited thereto.

As the non-aqueous organic solvent, the following aprotic organic solvents may be used: for example, N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy furan, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc., but are not limited thereto.

As the organic solid electrolyte, the followings may be used: for example, polyethylene derivatives, polyethylene oxide derivatives, polypropylene oxide derivatives, phosphate ester polymer, poly agitation lysine, polyester sulfide, polyvinyl alcohol, polyvinylidene fluoride, a polymer including an ionic dissociable group, etc.

As the inorganic solid electrolyte, the followings may be used: for example, Li nitrides, halides, sulfates, etc. such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_3PO_4$—$Li_2S$—$SiS_2$, etc.

As the lithium salt, the followings may be used as a material that may be well dissolved in the non-aqueous electrolyte: for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, lithium tetraphenyl borate, lithium imide, etc.

Further, the followings may be added into the non-aqueous electrolytic solution for the purpose of improving charge and discharge characteristics, flame resistance, etc.: for example, pyridine, triethyl phosphite, triethanolamine, cyclic ether, ethylenediamine, n-glyme, hexa phosphoric triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, etc. In some cases, a halogen-containing solvent such as carbon tetrachloride, trifluoroethylene, etc. may be further included therein to give incombustibility, carbon dioxide gas may be further included therein to improve preservative characteristics at high temperatures, and FEC (Fluoro-Ethylene Carbonate), PRS (Propene sultone), etc. may be further included, too.

The lithium secondary battery may be a lithium ion battery including various materials excluding lithium as a negative electrode active material; a lithium metal battery including lithium metal as a negative electrode active material; and a lithium-free battery which does not include a separate negative electrode active material, but receives lithium ions from the positive electrode during discharging to carry out precipitation.

At that time, the lithium metal battery and the lithium-free battery are particularly likely to have a formation of lithium dendrites, and thus are suitable for the present disclosure, and more suitable when including the electrode according to the present disclosure.

Such lithium secondary battery may be used as a power source of devices. The devices may be, for example, laptop computers, netbooks, tablet PCs, mobile phones, MP3, wearable electronic devices, power tools, electric vehicles (EV), hybrid electric vehicles (HEV), plug-in hybrid electric vehicles (PHEV), e-bikes, e-scooters, electric golf carts or electric power storage systems, but not limited thereto.

BRIEF DESCRIPTION OF THE DRAWINGS

FIG. 1 is an exploded perspective view of an electrode, a separator and a counter electrode, which are the components of an electrode assembly according to one example of the present invention; and FIG. 2 is an exploded perspective view of an electrode, a separator and a counter electrode, which are the components of an electrode assembly according to another example of the present invention.

DETAILED DESCRIPTION OF THE EMBODIMENTS

Hereinafter, the present invention will be described in detail with reference to the following examples. However, such examples are provided only for better understanding of the present invention, and thus the scope of the present invention is not limited thereto.

<Preparation Example 1> (Insulation Film)

An insulation tape (polyimide film, manufactured by TAIMIDE, TL-012, thickness: 50 μm) was prepared.

<Preparation Example 2> (Organic Layer)

Polyvinylidenefluoride-chlorotrifluoroethylene copolymer (PVdF-CTFE) was added into acetone in an amount of about 5 wt %, then dissolved at a temperature of 50° C. for about 12 hours to prepare a polymer composition.

<Preparation Example 3> (Organic-Inorganic Mixed Layer)

$BaTiO_3$ powder was added into the polymer solution of Preparation Example 2 above to reach $BaTiO_3$/PVdFCTFE=90/10 (wt % ratio), and then the resulting $BaTiO_3$ powder was crushed and pulverized by a ball mill method for 12 hours or more to prepare an organic-inorganic mixed composition. A particle diameter of the $BaTiO_3$ may be controlled depending on a size (particle size) of beads used in the ball mill method and a time applied for the ball mill method. In this Preparation Example, such $BaTiO_3$ powder was pulverized at about 400 nm to prepare the organic-inorganic mixed composition.

<Preparation Example 4> (Preparation of SRS Separator)

Polyvinylidenefluoride-chlorotrifluoroethylene copolymer (PVdF-CTFE) polymer was added into acetone in an amount of about 5 wt %, then dissolved at a temperature of 50° C. for about 12 hours to prepare a polymer solution. $BaTiO_3$ powder was added into such polymer solution to reach $BaTiO_3$/PVdFCTFE=90/10 (wt % ratio), and then the resulting $BaTiO_3$ powder was crushed and pulverized by a ball mill method for 12 hours or more to prepare a slurry. A particle diameter of the slurry prepared as above may be controlled depending on a size (particle size) of beads used in the ball mill method and a time applied for the ball mill method. In this Example 1, such $BaTiO_3$ powder was pulverized at about 400 nm to prepare the slurry. The slurry prepared as above was coated on a polyethylene separator with a thickness of about 18 μm (porosity 45%) by using a dip coating method, and a thickness of coating was adjusted to about 3.5 μm. The resulting separator was dried at 60° C. to form an active layer. As a result of measuring a porosity with a porosimeter, the size and porosity of pores in the active layer coated onto the polyethylene separator were 0.5 μm and 58%, respectively.

Example 1

A positive electrode mixture having a composition of 95 wt % of a positive electrode active material ($LiNi_{0.6}Co_{0.2}Mn_{0.2}O_2$), 2.5 wt % of Super-P (conductive material) and 2.5 wt % of PVDF (binding agent) was added into a solvent, i.e., NMP (N-methyl-2-pyrrolidone) to prepare a positive electrode slurry, which was then coated (100 μm) on an aluminum current collector, and then one aluminum tab was welded onto a non-coated portion of the current collector to prepare a positive electrode.

A copper foil (copper current collector) to which a copper tab was welded was taken as a negative electrode.

The positive electrode was prepared such that a portion excluding the tab to be 3.0×4.5 cm in size. The negative electrode was prepared such that a portion excluding the tab to be 3.2×4.7 cm in size. The insulation tape of Preparation Example 1 above was attached to a tab portion and an edge portion of the negative electrode, that is, a part of the tab as shown in an electrode 100 of FIG. 1 below and an edge portion as shown in an electrode 200 of FIG. 2 below.

The SRS separator obtained from Preparation Example 4 was interposed between the positive electrode and the negative electrode to prepare an electrode assembly, after which the electrode assembly was inserted into a pouch-type case and an electrode lead was connected thereto. Then, a solution of ethylene carbonate (EC) and dimethyl carbonate (DMC) at a volume ratio of 1:1, in which 1 M of $LiPF_6$ was dissolved, was infused thereto as an electrolyte, and then sealed to assemble a lithium-free battery.

Example 2

A lithium-free battery was assembled in the same manner as in Example 1, with an exception for applying (thickness: 50 μm) the organic layer of Preparation Example 2 above on a tab portion and an edge portion of a negative electrode as shown in an electrode 100 of FIG. 1 below, and drying at 60° C.

Example 3

A lithium-free battery was assembled in the same manner as in Example 1, with an exception for applying (thickness: 50 μm) the organic-inorganic mixed layer of Preparation Example 3 above on a tab portion and an edge portion of a negative electrode as shown in an electrode 100 of FIG. 1 below, and drying at 60° C.

Example 4

A lithium-free battery was assembled in the same manner as in Example 1, with an exception for attaching the insulation tape of Preparation Example 1 above onto an entire tab and an edge portion of a negative electrode as shown in an electrode 100 of FIG. 2 below.

Example 5

A lithium-free battery was assembled in the same manner as in Example 1, with an exception for applying (thickness:

50 µm) the organic layer of Preparation Example 2 above on an entire tab and an edge portion of a negative electrode as shown in an electrode 100 of FIG. 2 below, and drying at 60° C.

Example 6

A lithium-free battery was assembled in the same manner as in Example 1, with an exception for applying (thickness: 50 µm) the organic-inorganic mixed layer of Preparation Example 3 above on an entire tab and an edge portion of a negative electrode as shown in an electrode 100 of FIG. 2 below, and drying at 60° C.

Comparative Example 1

A lithium-free battery was assembled in the same manner as in Example 1, with an exception for not forming the insulation layer on a negative electrode.

Comparative Example 2

A lithium-free battery was assembled in the same manner as in Example 1, with an exception for attaching the insulation tape of Preparation Example 1 above onto only a tab portion of a negative electrode.

Experimental Example 1

To identify the safety of the lithium-free batteries manufactured in Examples 1 to 3 and Comparative Examples 1 and 2, a voltage drop phenomenon, which happens upon the occurrence of short circuit, was identified while a life evaluation was performed.

The life evaluation was performed with 1.8 C until 500 cycles in a 2.5-4.35 V section.

The results thereof are shown in the following Table 1.

TABLE 1

|  | Occurrence circuit of short | Number of cycles upon short circuit |
|---|---|---|
| Example 1 | None | — |
| Example 2 | None | — |
| Example 3 | None | — |
| Example 4 | None | — |
| Example 5 | None | — |
| Example 6 | None | — |
| Comparative Example 1 | Yes | 50 |
| Comparative Example 2 | Yes | 65 |

Referring to Table 1, it may be identified that the short circuit did not occur when following the present disclosure. This means that safety has been improved.

Experimental Example 2

To identify whether there was a decrease in the capacity of lithium-free batteries manufactured in Examples 1 to 3 and Comparative Examples 1 and 2, such capacity was measured in such a way that the manufactured batteries were charged at 25° C. with 0.1 C and an upper limit voltage of 4.3 V and then discharged again with 0.1 C and a lower limit voltage of 2.5 V. The results thereof are shown in the Table 2.

TABLE 2

|  | Discharge (mAh) capacity |
|---|---|
| Example 1 | 65 |
| Example 2 | 64 |
| Example 3 | 65 |
| Example 4 | 64 |
| Example 5 | 64 |
| Example 6 | 65 |
| Comparative Example 1 | 65 |
| Comparative Example 2 | 64 |

Referring to Table 2 above, it may be identified that there is not much decrease in capacity, even if the insulation layer according to the present disclosure is formed. In particular, in the case of using the organic-inorganic mixed layer of Example 3, and even in the case of forming the insulation layer on a portion overlapping with the counter electrode, it was identified that the capacity of battery is similar to that of the case of not forming the insulation layer.

Meanwhile, when taking Examples 4 to 6 into consideration, if the insulation layer is formed on the entire tab, it is preferable that such layer is formed as the organic-inorganic mixed layer in terms of capacity.

It is to be understood that those skilled in the art to which the present invention pertains may carry out various applications and modifications based on the descriptions above within the scope of the present invention.

INDUSTRIAL APPLICABILITY

As described above, the electrode assembly according to the present disclosure includes an insulation layer not only on a tab portion but also on an edge portion of an electrode to increase a strength of lamination and effectively prevent a short circuit between electrodes caused by an external shock and a formation of dendrites, thereby securing safety.

Further, in case of forming the insulation layer as an organic-inorganic mixed layer, and even if the insulation layer is formed in a portion of the electrode facing a counter electrode, lithium ions may be moved to have an effect of preventing a decrease in capacity.

The invention claimed is:

1. An electrode assembly having a stack form of an electrode, a separator and a counter electrode, stacked in that order,
    wherein each of the electrode and the counter electrode comprises a tab extending from the same side of each;
    the electrode is larger than the counter electrode so that each side of the electrode is exposed when the electrode is stacked with the counter electrode;
    an insulation layer is disposed on the tab of the electrode and only on a perimeter of a surface of the electrode such that all edge portions of the electrode are in contact with the insulation layer,
    an entire body of the insulation layer is directly interposed between the electrode and the separator.

2. The electrode assembly of claim 1, wherein the insulating layer disposed on the tab of the electrode is an entire tab or a part of the tab of the electrode or the counter electrode.

3. The electrode assembly of claim 1, wherein the edge portion of the electrode comprises exposed portion not facing the counter electrode.

4. The electrode assembly of claim 1, wherein the edge portion of the electrode comprises exposed portion not facing the counter electrode and a part of the edge portion facing the counter electrode.

5. The electrode assembly of claim 1, wherein the insulation layer is an insulation film, an organic layer consisting of a binder polymer, or an organic-inorganic mixed layer comprising inorganic particles and a binder polymer.

6. The electrode assembly of claim 1, wherein a thickness of the insulation layer is 0.1 to 100 µm.

7. The electrode assembly of claim 1, wherein the electrode is a negative electrode and the counter electrode is a positive electrode.

8. The electrode assembly of claim 1, wherein the electrode is a positive electrode and the counter electrode is a negative electrode.

9. The electrode assembly of claim 1, wherein the separator is a Safety Reinforced Separator (SRS) separator having a structure in which the organic and inorganic composite porous coating layer is coated on a substrate of a polyolefin-based separator.

10. A lithium secondary battery comprising the electrode assembly according to claim 1 and an electrolyte.

11. The lithium secondary battery of claim 10, wherein the lithium secondary battery is a lithium ion battery, a lithium metal battery or a lithium-free battery.

12. The electrode assembly of claim 1, wherein the insulating film comprises a thermoplastic polymer.

13. The electrode assembly of claim 12, wherein the thermoplastic polymer comprises selected from polyimide (PI), polyethylene (PE), polypropylene (PP), polyethylene terephthalate (PET) and polybutylene terephthalate (PBT).

14. The electrode assembly of claim 12, wherein the thermoplastic polymer comprises polyimide (PI).

15. The electrode assembly of claim 1, wherein the insulating film comprises an organic layer consisting of a binder polymer.

16. The electrode assembly of claim 15, wherein the binder polymer is selected from polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

17. The electrode assembly of claim 15, wherein the binder polymer comprises polyvinylidenfluoride-chlorotrifluoroethylene copolymer (PVdF-CTFE).

18. The electrode assembly of claim 1, wherein the insulating film comprises an organic-inorganic mixed layer including inorganic particles and a binder polymer.

19. The electrode assembly of claim 18, wherein the binder polymer is selected from polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

20. The electrode assembly of claim 18, wherein the inorganic particles have piezoelectricity.

\* \* \* \* \*